United States Patent [19]
Ide et al.

[11] Patent Number: 5,495,517
[45] Date of Patent: Feb. 27, 1996

[54] RADIO COMMUNICATION APPARATUS CAPABLE OF CARRYING OUT RADIO PAGING ANNOUNCEMENT WITH GENERATION OF A TONE AFTER PORTABLE TELEPHONE COMMUNICATION HAS FINISHED

[75] Inventors: Motoki Ide, Tokyo; Kazunobu Yamada, Shizuoka, both of Japan

[73] Assignee: NEC Corporation, Tokyo, Japan

[21] Appl. No.: 333,328

[22] Filed: Nov. 2, 1994

[30] Foreign Application Priority Data

Nov. 19, 1993 [JP] Japan ..................... 5-289663

[51] Int. Cl.⁶ ............................ H04M 11/00; H04Q 3/02
[52] U.S. Cl. ............................ 379/57; 379/58; 455/38.4
[58] Field of Search ..................... 379/58, 59, 63, 379/57; 455/12.1, 51.2, 33.1, 38.1, 38.2, 38.4, 38.5; 340/825.44, 825.46

[56] References Cited

U.S. PATENT DOCUMENTS

| | | | |
|---|---|---|---|
| 4,904,992 | 2/1990 | Grothause | 340/825.44 |
| 5,054,052 | 10/1991 | Nonami | 379/57 |
| 5,117,449 | 5/1992 | Metroka et al. | 379/58 |
| 5,148,473 | 9/1992 | Freeland et al. | 379/59 |
| 5,392,452 | 2/1995 | Davis | 455/38.1 |

FOREIGN PATENT DOCUMENTS 364133  3/1991  Japan .
4294645 10/1992  Japan .

Primary Examiner—Curtis Kuntz
Assistant Examiner—Nay Aung Maung
Attorney, Agent, or Firm—Whitham, Curtis, Whitham & McGinn

[57] ABSTRACT

In a radio communication apparatus having both portable telephone portion and radio paging portion, the portable telephone portion comprises a portable telephone transmission/reception unit 21, a control unit 23, a speech transceiver 25, a display unit 27, and an operation unit 29, while the radio paging portion comprises a radio paging receiver unit 31, the control unit 23, the display unit 27, the operation unit 29, a tone generation announcement unit 33, a silent announcement unit 35, an announcement mode memory 39, and a reception information memory 37. It is assumed that the operation unit 29 selects "a delayed announcement mode after completion of communication" and stores this mode in the announcement mode memory 39. In this event, when the radio paging operation is received during communication of the portable telephone portion, the control unit 23 makes the silent announcement unit 35 carry out call announcement in a silent mode and makes the reception information memory 37 memorize a message. After completion of the communication, the control unit 23 makes the tone generation announcement unit 33 announce reception of the radio paging operation during communication and makes the display unit 27 collectively display the reception information.

5 Claims, 2 Drawing Sheets

RADIO COMMUNICATION APPARATUS CAPABLE OF CARRYING OUT RADIO PAGING ANNOUNCEMENT WITH GENERATION OF A TONE AFTER PORTABLE TELEPHONE COMMUNICATION HAS FINISHED

BACKGROUND OF THE INVENTION

This invention relates to a radio communication apparatus, such as a portable telephone set with a radio paging function, for use in a portable telephone system such as a mobile telephone system and in a radio paging system.

A conventional radio communication apparatus of the type described comprises a portable telephone portion for carrying out mutual communication with a portable telephone base station, a radio paging portion responsive to a radio paging signal for carrying out call announcement in a tone generation mode, call announcement in a silent mode, and display announcement of a message, and a display unit for displaying reception information of the radio paging signal.

Examples of the conventional radio communication apparatus are disclosed in Published Japanese Patent Applications Nos. 294645/1992 and 64133/1991.

The radio communication apparatus is adapted for use in a portable telephone system and a radio paging system independent from each other. Even at a position beyond a communication area of the portable telephone system, a radio paging operation can be carried out. Upon reception of a radio paging operation outside the communication area of the portable telephone system, a user of such radio communication apparatus moves into the communication area of the portable telephone system and then contacts, by the use of the portable telephone function of the radio communication apparatus, a person who initiates the radio paging operation.

Each of the conventional radio communication apparatus described above carries out call announcement (radio paging operation) every time upon reception of a radio paging signal coincident with a paging number assigned thereto (hereinafter referred to as reception of a radio paging operation), irrespective of whether or not a portable telephone function is used, namely, whether or not the radio communication apparatus is in a communication state. Accordingly, when the radio communication apparatus is within a communicable area of a portable telephone base station of the portable telephone system, call announcement by the radio paging function can be made during communication by the portable telephone function. However, during communication by the portable telephone function, generation of a tone for call announcement results in hindrance of communication.

SUMMARY OF THE INVENTION

It is therefore an object of this invention to provide a radio communication apparatus for use in a portable telephone system and a radio paging system, in which conversation is not disturbed by generation of a call announcement tone even if a radio paging signal is received during communication by the use of portable telephone function.

Other objects of this invention will become clear as the description proceeds.

On describing the gist of the present invention, it is readily understood that the radio communication apparatus is for use in a portable telephone system and a radio paging system, the portable telephone system comprising a portable telephone base station, the radio paging system comprising a radio paging base station.

The above-understood apparatus comprising: (A) portable telephone means for carrying out mutual communication with the portable telephone base station; (B) radio paging means responsive to a radio paging signal for carrying out call announcement in a tone generation mode, call announcement in a silent mode, and display announcement of a message; (C) display means for displaying reception information of the radio paging signal; (D) communication state monitoring means for monitoring whether or not the portable telephone means is in a communication state; (E) tone generation announcement permitting means for making the call announcement be carried out in the tone generation mode when the portable telephone means is in a noncommunication state; (F) tone generation announcement inhibiting means for making the call announcement be carried out in the silent mode, when the portable telephone means is in a communication state; (G) reception information memorizing means for memorizing the reception information when the radio paging signal is received during the communication state; and (H) reception information batch announcement means for collectively announcing the memorized reception information after completion of the communication state of the portable telephone means.

The radio paging means may comprise: announcement mode input means for inputting announcement mode information indicative of the timing of the call announcement in a tone generation mode, the call announcement in a silent mode, and the display announcement of a message that is selected from immediate announcement and delayed announcement after completion of communication of the portable telephone means; announcement mode memorizing means for memorizing the announcement mode information; and immediate tone generation announcement permitting means for making the call announcement be carried out in the tone generation mode even if the portable telephone means is in a communication state, inasmuch as the memorized announcement mode information specifies the immediate announcement.

The reception information may include announcement type information indicative of an announcement type that is selected from the call announcement in a tone generation mode, the call announcement in a silent mode, and the display announcement of a message, message information if the announcement type information contains the message, and reception time information indicative of a reception time of the radio paging signal.

The communication state monitoring means may monitor the communication state by detecting a hook on/off signal of the portable telephone means.

The call announcement in the silent mode may be carried out by the use of at least one of vibration and light.

DESCRIPTION OF THE PREFERRED EMBODIMENT

Figure 1:
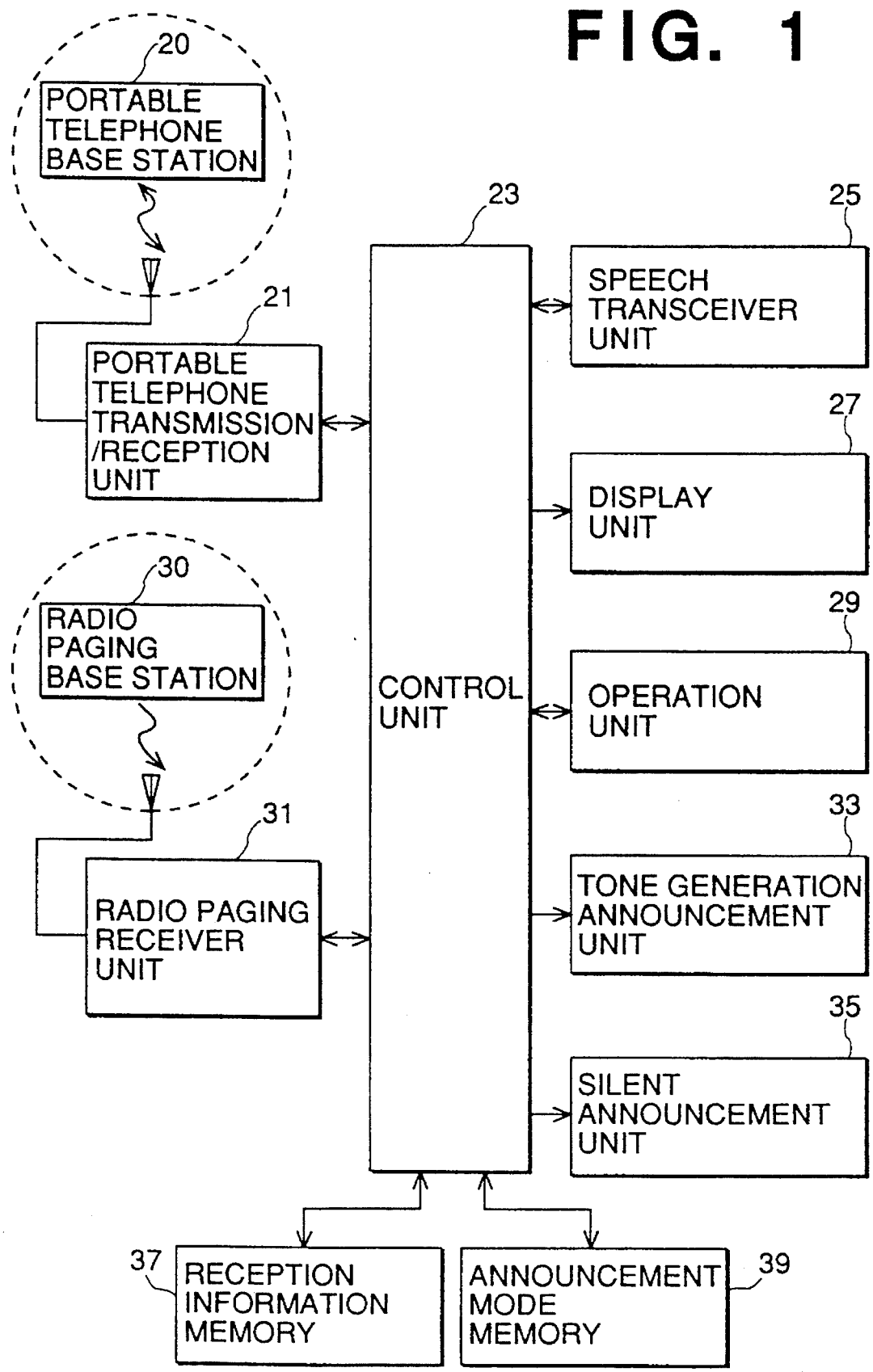
FIG. 1 is a block diagram of the radio communication apparatus according to an embodiment of this invention.
Figure 2:
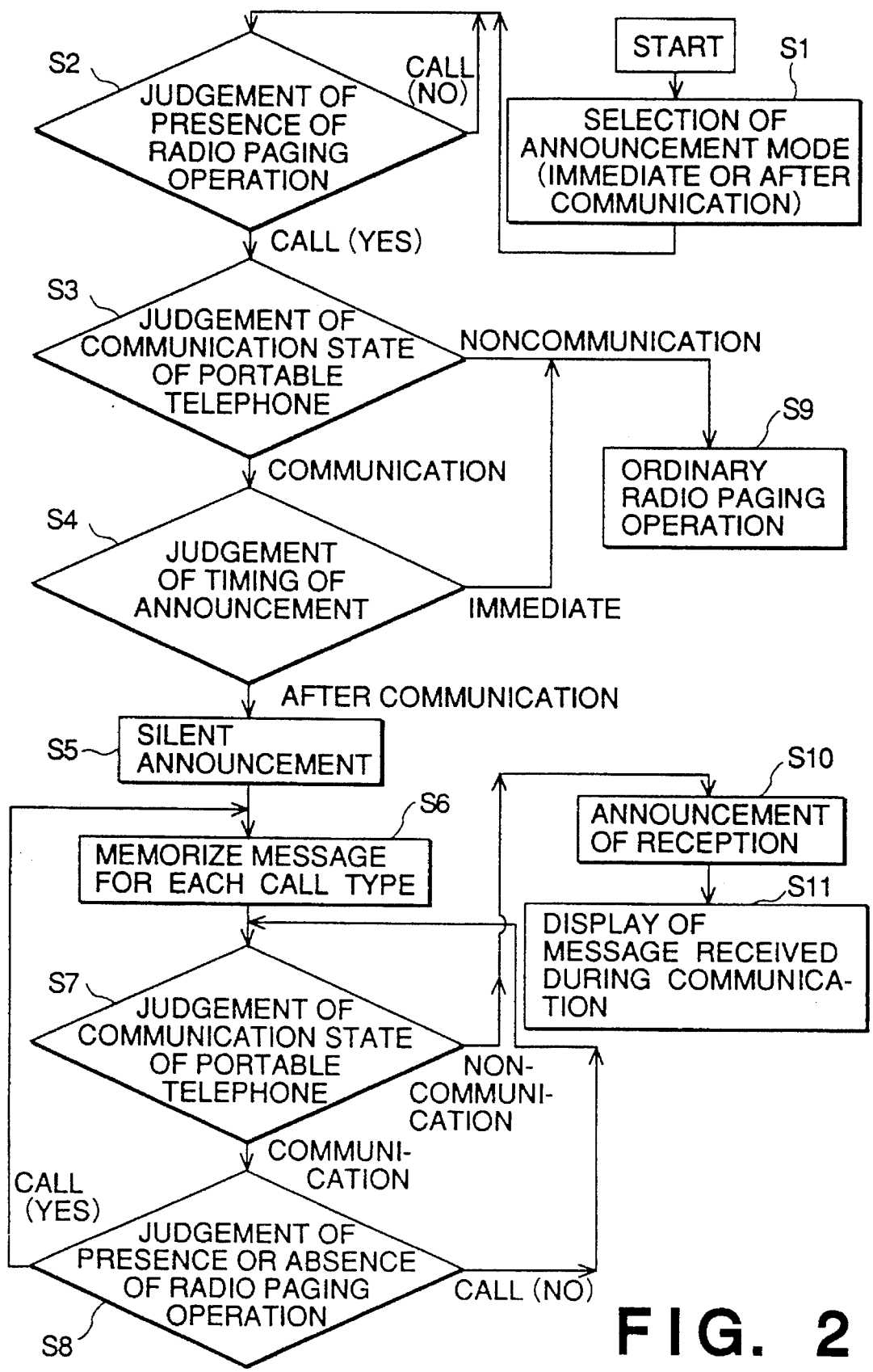
FIG. 2 is a flow chart for describing a radio paging operation of the radio communication apparatus illustrated in FIG. 1.

Referring to FIGS. 1 and 2, description will proceed to a radio communication apparatus according to an embodiment of this invention.

The illustrated radio communication apparatus has both a portable telephone function in a portable telephone system and a radio paging function in a radio paging system, both of the systems are independent from each other. In other words, the radio communication apparatus has both a function of a portable telephone set and a function of a radio paging receiver. The above-mentioned portable telephone system is a cellular mobile telephone system, for example, a PDC (personal Digital Cellular) system (in a radio frequency band of 800 MHz). The above-mentioned radio paging system is an NTT system or a POCSAG system (in either system, a radio frequency band of 280 MHz is used).

As illustrated in FIG. 1, the radio communication apparatus has, as a portable telephone portion for executing the function of the portable telephone set, a portable telephone transmission/reception unit 21, a control unit 23, and a speech transceiver unit 25, a display unit 27, and an operation unit 29. Further, the radio communication apparatus has, as a radio paging portion for executing the function of the radio paging receiver, a radio paging receiver unit 31, the control unit 23, the display unit 27, the operation unit 29, a tone generation announcement unit 33, a silent announcement unit 35, a reception information memory 37, and an announcement mode memory 39. Although the control unit 23, the display unit 27, and the operation unit 29 are used in common in the portable telephone portion and the radio paging portion, almost all functions of these components are independently used in both portions independently from one another.

Description will at first be made as regards the function and the operation of the portable telephone portion in the radio communication apparatus. The portable telephone transmission/reception unit 21 includes an antenna, a distributor, a reception circuit, a transmission circuit, and a frequency synthesizer, although these are not shown in FIG. 1. The portable telephone transmission/reception unit 21 carries out mutual communication with a portable telephone base station 20 of the portable telephone system through a radio transmission path in a 800 MHz band. The control unit 23 includes a microprocessor and an ROM for storage of an ID number and programs. In response to an operation instruction such as a call origination instruction from the operation unit 29, a control/communication signal from the portable telephone transmission/reception unit 21, and a speech transmission signal from the speech transceiver unit 25, the control unit 23 controls and drives the portable telephone transmission/reception unit 21, the display unit 27, the operation unit 29, and the speech transceiver unit 25. The speech transceiver unit 25 includes a microphone and a loudspeaker and serves as a speech interface with a user of the radio communication apparatus. The display unit 27 includes a visible device such as an LCD as a display panel and is driven by the control unit 23 to display operation information for the portable telephone portion.

Next, description will proceed to the function and the operation of the radio paging portion in the radio communication apparatus. The radio paging receiver unit 31 includes an antenna, a radio circuit, a waveform shaping circuit, and a timer circuit. The radio paging receiver unit 31 receives a radio paging signal (in a frequency band of 280 MHz) from a radio paging base station 30 of the radio paging system to produce a digital signal. The radio paging signal includes address information and, possibly, message information. The address information contains an announcement type (call type) of a radio paging operation, such as "tone only" or "with message". The control unit 23 further includes an ROM for storage of a paging number. The control unit 23 drives the display unit 27, the tone generation announcement unit 33, and the silent announcement unit 35 in response to an operation instruction from the operation unit 29 and the digital signal from the radio paging receiver unit 31. Supplied from the control unit 23 with the display information including the message information and reception time information indicative of a reception time of the radio paging signal, the display unit 27 converts the display information into a sequence of numerals and characters understandable by the user. The converted information is displayed on the display panel of the LCD. Specifically, the display unit 27 displays the reception information of the radio paging operation, including the address information, the message information, and the reception time information, together with operation information of the radio paging operation. The tone generation announcement unit 33 generates a sound by an audio wave generation circuit such as a loudspeaker. The silent announcement unit 35 generates at least one of vibration (by a vibration device such as a vibrator) and light (by a visible device such as a light emission diode). The tone generation announcement unit 33 and the silent announcement unit 35 announce the reception of the radio paging operation to the user of the radio communication apparatus. The radio paging operation is carried out by either the tone generation announcement unit 33 or the silent announcement unit 35 under control of the control unit 23.

Next, description will proceed to an announcement process in the radio communication apparatus illustrated in FIG. 1 upon reception of the radio paging operation during communication by the portable telephone function. This process is a characteristic of this invention.

In the radio paging portion, the control unit 23 monitors whether or not the portable telephone portion is in a communication state. This monitoring of the communication state is carried out by monitoring an off-hook signal produced by the speech transceiver unit 25. Specifically, the control unit 23 judges that the portable telephone portion is in a "noncommunication state" when an on-hook state is indicated by the off-hook signal representative of a position of the speech transceiver unit 25 which may be lifted off from a normal position. Likewise, the control unit 23 judges that the portable telephone portion is in a "communication state" when the off-hook signal indicates an off-hook state. It will be understood that the off-hook signal may be produced by on and off of a hook switch provided in the operation unit 29 to activate the speech transceiver unit 25.

The user of this radio communication apparatus enters through the operation unit 29 the announcement mode information specifying the timing of announcement of the radio paging operation. The announcement mode information includes "an immediate announcement mode" and "a delayed announcement mode after completion of communication". The announcement mode information designates the timing of announcement of the radio paging operation when the radio paging operation is received during the communication state of the portable telephone portion. Specifically, when "the immediate announcement mode" is designated, the radio paging portion immediately carries out the radio paging operation by the tone generation announcement unit 33 and the display unit 27 irrespective of the communication state of the portable telephone function. On the other hand, "the delayed announcement mode after completion of communication" is designated, the radio paging operation by the display unit 27 and the tone generation announcement unit 33 is carried out after completion of the communication state of the portable telephone portion. The announcement mode information is stored (memorized) through the control unit 23 in the announcement mode memory 39 of an RAM.

It is now assumed that "the delayed announcement after completion of communication" is designated and the radio paging operation is received during the communication state of the portable telephone portion. In this event, the control unit 23 makes the silent announcement unit 35 carry out call announcement and makes the reception information memory 37 of an RAM store the reception information of the radio paging operation. After the communication state of the portable telephone portion is finished, the control unit 23 makes the tone generation announcement unit 33 announce reception of the radio paging operation during communication and makes the display unit 27 collectively display the reception information of the radio paging operation memorized in the reception information memory 37.

Referring to FIG. 2 with reference to FIG. 1 continued, the user of the radio communication apparatus at first selects, as the announcement mode information, one of "the immediate announcement mode" and "the delayed announcement mode after completion of communication" (step 1, steps will hereinafter be abbreviated to S). The announcement mode information is selected in the manner which will presently be described. The display unit 27 displays an announcement selection scene. The user enters, through the operation unit 29, announcement mode information as desired in accordance with instructions given in the announcement selection scene. The announcement mode information is memorized through the control unit 23 in the announcement mode memory 39.

The radio paging portion of the radio communication apparatus receives the radio paging signal and the control unit 23 judges presence or absence of the radio paging operation (S2). In absence of the radio paging operation, the step S2 is repeated. When the presence of the radio paging operation is detected, the control unit 23 judges the communication state of the portable telephone portion (S3). When the portable telephone portion is in a noncommunication state, the control unit 23 drives the tone generation announcement unit 33 to carry out tone generation announcement. At this time, when the radio paging signal contains message information, the control unit 23 makes the display unit 27 display the message (S9).

On the other hand, when the portable telephone portion indicates the communication state (during communication) in the step S3, the control unit 23 judges the timing of announcement with reference to the announcement mode information memorized in the announcement mode memory 39 (S4). When the announcement mode information indicates "the immediate announcement mode", the operation proceeds to the step S9. In this step, the control unit 23 makes the tone generation announcement unit 33 and the display unit 27 immediately carry out the radio paging operation, in the manner similar to the case where the portable telephone portion is in the noncommunication state. When the judgement of the timing of announcement in the step S4 results in "the delayed announcement mode after completion of communication", the control unit 23 drives the silent announcement unit 35 to carry out silent announcement (S5). When the message information is present in the radio paging signal received by the radio paging portion, the control unit 23 makes the reception information memory 37 memorize the message information individually for each call type (S6).

After completion of the step S6, the control unit 23 of the radio paging portion again monitors the communication state of the portable telephone portion (S7). When the portable telephone portion is put in a noncommunication state, the control unit 23 makes the tone generation announcement unit 33 carry out call announcement of the radio paging operation which has been received during communication of the portable telephone portion (S10). The control unit 23 extracts from the reception information memory 37 the reception information (the call type information, the message information, and the reception time information) of the radio paging operation which has been received during the communication. The control unit 23 makes the display unit 27 display the reception information (S11). When the portable telephone portion indicates the communication state in the step S7, namely, when the communication is continued, the control unit 23 again proceeds to monitoring of a next radio paging operation (S8). When no radio paging operation is received in the step S8, the control unit 23 again proceeds to judgement of the communication state of the portable telephone portion (S7). In presence of the radio paging operation, the control unit 23 proceeds to a message memorizing step (S6) for each individual call type.

Summarizing in FIGS. 1 and 2, the portable telephone system comprises a portable telephone base station (20) while the radio paging system comprises a radio paging base station (30). A portable telephone portion (21, 23, 25, 27, 29) carries out mutual communication with the portable telephone base station (20). The radio paging portion (31, 23, 27, 29, 33, 35, 37, 39), responsive to a radio paging signal, carries out call announcement in a tone generation mode (33, S9), call announcement in a silent mode (35, S5), and display announcement of a message (27, S11). The display unit (27) displays reception information (S10, S11) of the radio paging signal. The communication state monitoring section (23, S3, S7) monitors whether or not the portable telephone portion (21) is in a communication state. The tone generation announcement permitting section (23, 33) makes the call announcement be carried out in the tone generation mode (S9, S10) when the portable telephone portion (21) is in a noncommunication state. The tone generation announcement inhibiting section (23, 35) makes the call announcement be carried out in the silent mode (S5), when the portable telephone section (21) is in a communication state. The reception information memorizing section (37) memorizes the reception information (S6) when the radio paging signal is received during the communication state. The reception information batch announcement section (23, S11) collectively announces the memorized reception information after completion of the communication state of the portable telephone portion (21).

The radio paging portion (31, 23, 27, 29, 33, 35, 37, 39) comprises announcement mode input section (29, S1) for inputting announcement mode information indicative of the timing of the call announcement in a tone generation mode (S9), the call announcement in a silent mode (S5), and the display announcement of a message (S11) that is selected from immediate announcement and delayed announcement after completion of communication of the portable telephone portion (21). The radio paging portion (31, 23, 27, 29, 33, 35, 37, 39) also comprises announcement mode memorizing section (39) for memorizing the announcement mode information, and immediate tone generation announcement permitting section (23, 33, S4, S9) for making the call announcement be carried out in the tone generation mode (S9) even if the portable telephone portion (21) is in a communication state, inasmuch as the memorized announcement mode information (S1) specifies the immediate announcement.

The reception information includes announcement type information indicative of an announcement type that is selected from the call announcement in a tone generation mode (S9), the call announcement in a silent mode (S5), and the display announcement of a message (S11), message information if the announcement type information contains the message, and reception time information indicative of a reception time of the radio paging signal.

The communication state monitoring section (23, S3, S7) monitors the communication state by detecting a hook on/off signal of the portable telephone portion (21).

The call announcement in the silent mode (S5) is carried out by the use of at least one of vibration and light.

As described above, the radio communication apparatus according to this invention is capable of carrying out the radio paging operation by tone generation and display after completion of the communication. Even if the radio paging operation is received during communication of the portable telephone portion, the user of the radio communication apparatus is not disturbed by generation of the call announcement tone during communication and can concentrate upon conversation without paying any attention to the radio paging operation.

While this invention has thus far been described in conjunction with a specific embodiment thereof, it will now be readily possible for one skilled in the art to put this invention into effect in various other manners. For example, the portable telephone system is not restricted to the cellular mobile telephone system while the radio paging system is not restricted to the NTT system or the POCSAG system.

What is claimed is:

1. A radio communication apparatus for use in a portable telephone system and a radio paging system, said portable telephone system comprising a portable telephone base station, said radio paging system comprising a radio paging base station, said apparatus comprising:

portable telephone means for carrying out mutual communication with said portable telephone base station;

radio paging means responsive to a radio paging signal for carrying out call announcement in a tone generation mode, call announcement in a silent mode, and display announcement of a message;

display means for displaying reception information of said radio paging signal;

communication state monitoring means for monitoring whether or not said portable telephone means is in a communication state;

tone generation announcement permitting means for making said call announcement to be carried out in said tone generation mode when said portable telephone means is in a noncommunication state;

tone generation announcement inhibiting means for making said call announcement to be carried out in said silent mode, when said portable telephone means is in a communication state;

reception information memorizing means for memorizing said reception information when said radio paging signal is received during said communication state; and reception information batch announcement means for collectively announcing said memorized reception information after completion of said communication state of said portable telephone means.

2. A radio communication apparatus as claimed in claim 1, wherein said radio paging means comprises:

announcement mode input means for inputting announcement mode information indicative of the timing of said call announcement in a tone generation mode, said call announcement in a silent mode, and said display announcement of a message that is selected from immediate announcement and delayed announcement after completion of communication of said portable telephone means;

announcement mode memorizing means for memorizing said announcement mode information; and immediate tone generation announcement permitting means for making said call announcement be carried out in said tone generation mode even if said portable telephone means is in a communication state, inasmuch as said memorized announcement mode information specifies the immediate announcement.

3. A radio communication apparatus as claimed in claim 1, wherein said reception information includes announcement type information indicative of an announcement type that is selected from said call announcement in a tone generation mode, said call announcement in a silent mode, and said display announcement of a message, message information if said announcement type information contains said message, and reception time information indicative of a reception time of said radio paging signal.

4. A radio communication apparatus as claimed in claim 1, wherein said communication state monitoring means monitors said communication state by detecting a hook on/off signal of said portable telephone means.

5. A radio communication apparatus as claimed in claim 1, wherein said call announcement in said silent mode is carried out by the use of at least one of vibration and light.

* * * * *